United States Patent
Diest

[11] 3,752,403
[45] Aug. 14, 1973

[54] IRRIGATION SYSTEM

[76] Inventor: Anthony Van Diest, 15305 Oliva Ave., Paramount, Calif. 90723

[22] Filed: June 27, 1972

[21] Appl. No.: 266,700

[52] U.S. Cl............................... 239/204, 239/288.5
[51] Int. Cl...................... B05b 15/10, B05b 15/00
[58] Field of Search.................... 239/104, 123, 201, 239/203, 204, 205, 288, 288.3, 288.5

[56] References Cited
UNITED STATES PATENTS

| | | | |
|---|---|---|---|
| 1,484,888 | 2/1924 | Johnson | 239/204 |
| 3,033,467 | 5/1962 | Hofer | 239/204 |
| 3,263,929 | 8/1966 | Seablom | 239/204 |

Primary Examiner—Robert S. Ward, Jr.
Attorney—William C. Babcock

[57] ABSTRACT

An irrigation system that is connected to a source of water under pressure, and is buried in a field at a depth that is below the maximum depth to which the field will be plowed, and below the frost line if the installation is made in an area subject to severe winters.

The system includes a number of spaced, vertically positioned cylinders that have vertically movable elongate members operatively associated therewith, and which members are substantially retractable into the cylinders. The upper ends of the cylinders are disposed a substantial distance below the maximum depth to which the field in which they are installed will be plowed. The members support spray heads and sets of pivotally movable protectors on the upper ends thereof.

The members, spray heads and sets of protectors may be forced either upwardly or downwardly through the ground defining the field by the pressure on the water used for irrigation purposes. After the members, spray heads and sets of protectors have been moved upwardly to a maximum extent, the spray heads are disposed a desired elevation above the surface of the field, and water discharges from the spray heads onto the upper surface of the field to irrigate the same.

When the irrigation is completed, water is discharged into the upper portions of the cylinders, with concurrent discharge of water from the lower portions thereof, and the members, spray heads and protectors being forced downwardly through the ground until the spray heads are adjacently disposed to the upper ends of the cylinders. The sets of protectors are of such shape that as they move upwardly and downwardly through the ground the force exerted by the ground on these protectors maintains the latter in an encircling position about the spray heads to prevent damage being done thereto, as well as earth and debris being forced into the spray heads to clog the same.

When the members, spray heads and sets of protectors are in the retracted positions beneath the ground surface, plowing and cultivating of the field in which they are installed may be carried out without danger of the irrigation system being damaged as a result thereof.

6 Claims, 6 Drawing Figures

FIG. 1
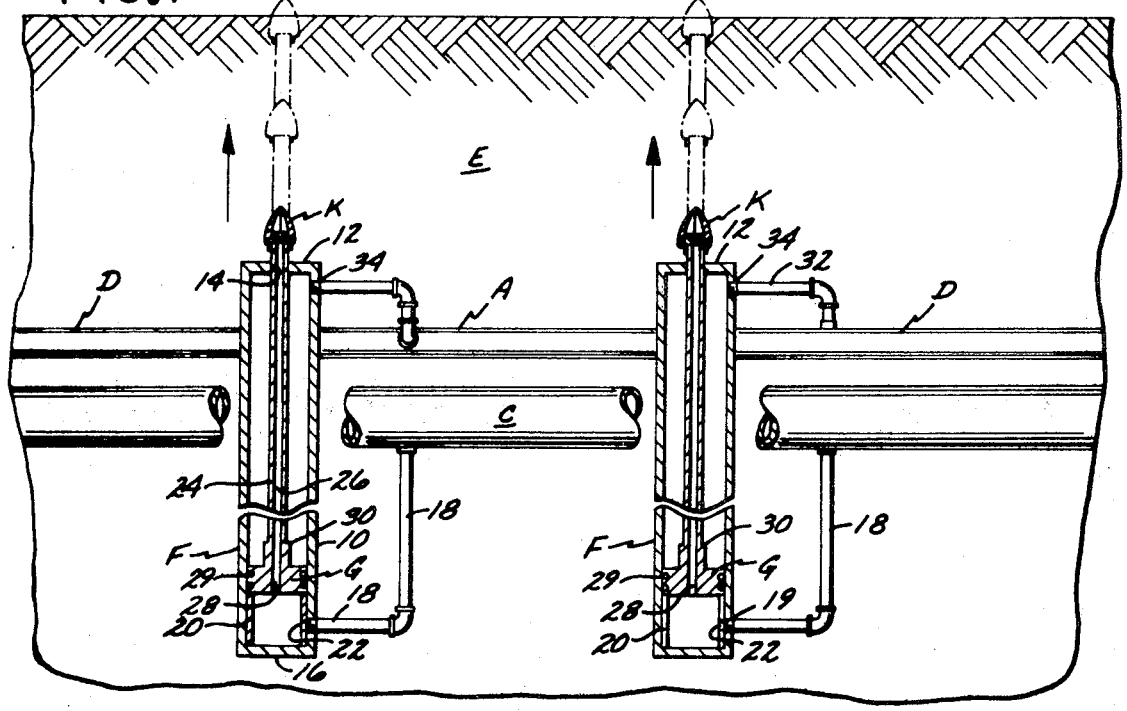
FIG. 3
FIG. 4
FIG. 2
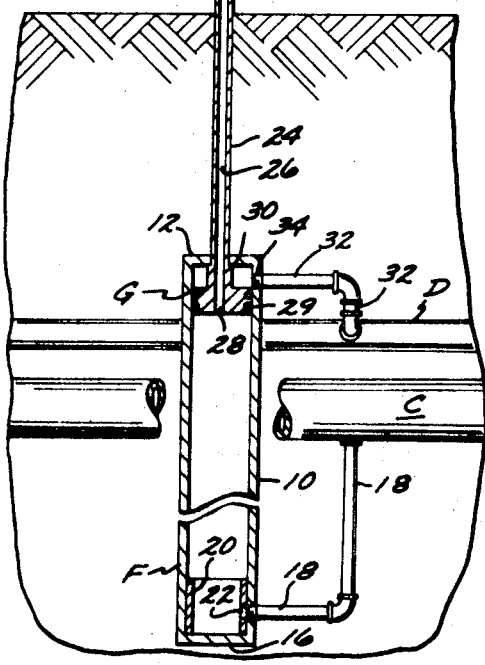
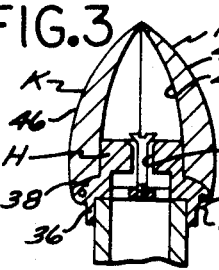
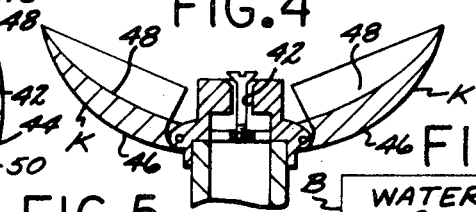
FIG. 5
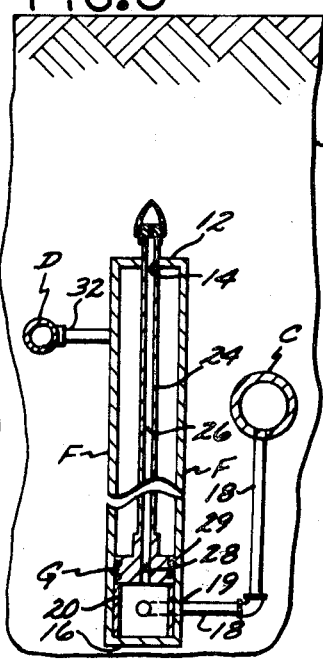
FIG. 6
WATER SOURCE
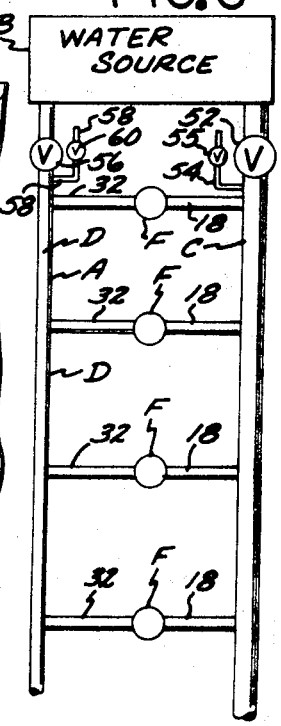

3,752,403

IRRIGATION SYSTEM

BACKGROUND OF THE INVENTION

1. Field of the Invention

An irrigation system.

2. Description of the Prior Art

In the past, irrigation of fields has either been carried out by fixed installations that are at least partially located at the ground surface of a field, or movable systems that are supported on the ground surface.

Irrigation systems that embody fixed installations have the operational disadvantage that they render plowing and cultivating of a field in which they are located difficult. Movable irrigation systems have the operational disadvantages that they are extremely expensive, require extensive maintenance attention, and must be operated by skilled personnel having substantial mechanical ability.

The primary purpose in devising the present irrigation system is to supply one that may be buried in a field at a depth that is greater than the maximum depth to which the field will be plowed, as well as below the frost line if the installation is made in a field that is subject to severe winters. The present invention, when so installed, will not interfere with plowing or cultivation of the field.

The irrigation water that is under pressure is utilized in the present invention to serve not only the purpose of irrigation, but also as a motive power to move the spray heads to elevated positions above the field surface where spray may be discharged therefrom to irrigate the surface of the field, as well as to retract the spray heads to positions below the ground surface where they are buried at such a depth as not to be encountered when the field is plowed or cultivated.

SUMMARY OF THE INVENTION

An irrigation system that includes a number of spaced, vertically positioned cylinders that are buried below the ground surface, with the cylinders having ported pistons therein that are connected to upwardly extending tubular members that support spray heads on the upper ends thereof. The tubular members are vertically movable in openings formed in the top portions of the cylinders. Irrigation water under pressure may be selectively discharged into either upper or lower portions of the cylinders to force the pistons, tubular members and spray heads upwardly or downwardly relative to the cylinders.

Each spray head has a set of pivotally supported protectors operatively associated therewith. Each set of protectors is of such shape that when the spray head with which it is associated is moved upwardly or downwardly through the ground, the force exerted by the ground on the set of protectors in resisting such movement maintains the set of protectors in an encircling position about the spray head to prevent damage being done thereto.

The water used in irrigating is not only used for that purpose, but the pressure thereon is used to move the pistons, tubular members and spray heads to either positions where the spray heads are a substantial distance above the ground surface as spray is discharged therefrom for irrigation purposes, or the assembly above described is forced downwardly through the ground to positions where the spray heads and sets of protectors are adjacently disposed relative to the upper ends of the cylinders. The spray heads and sets of protectors when so disposed adjacent the upper ends of the cylinders are located at a sufficient depth below the ground surface as not to be contacted and damaged by plowing or cultivation of the field. The cylinders, when the irrigation system is located in an area subject to severe winters, are located in the ground below the frost line to prevent water in the irrigation system freezing and doing damage to the cylinders and connecting pipe-lines.

BRIEF DESCRIPTION OF THE DRAWING

FIG. 1 is a combined vertical cross-sectional and side elevational view of a portion of the irrigation system in a buried position in a field that is to be irrigated;

FIG. 2 is a combined vertical cross-sectional and side elevational view of a portion of the irrigation system, with the piston, rigid tubular member connected thereto, spray head supported from the upper end of the tubular member, and the set of protectors being disposed in the uppermost elevated position that they can occupy relative to the cylinders;

FIG. 3 is an enlarged fragmentary side elevational view of an upper portion of one of the tubular members, with the spray head mounted thereon, and the set of protectors pivotally supported in a first position where they extend about the spray head to prevent damage being done thereto as the spray head is moved upwardly and downwardly through the ground defining the field that is to be irrigated, as well as preventing earth and debris entering and clogging the spray head;

FIG. 4 is the same fragmentary, vertical cross-sectional view shown in FIG. 3, but with the protectors having been pivoted outwardly to positions where spray may freely discharge from the spray head to irrigate the surface of a field situated below the spray head;

FIG. 5 is a vertical cross-sectional view of a portion of the invention, but with the piston, tubular member connected thereto, spray head and set of protectors having been retracted to be below the ground surface of the field to be irrigated; and FIG. 6 is a diagrammatic view of the source of irrigation water under pressure, and the valving and conduits leading to the cylinders that support the pistons, tubular members, spray heads and set of protectors.

DESCRIPTION OF THE PREFERRED EMBODIMENT

The irrigation system A, as may be seen best in FIGS. 1 and 6, includes a source of water B under pressure that is connected to a first main water supply line C and a secondary water supply line D of substantially smaller diameter. The ground E that is to be irrigated has a number of spaced, substantially vertically disposed cylinder F buried therein.

Each of the cylinders F includes a cylindrical shell 10 that has a first upper end 12 in which a centrally disposed opening 14 is formed. Each shell 10 has a second end 16 that closes the lower extremity thereof. The first water supply line C has a number of laterals 18 extending therefrom that are by conventional means 19, such as threads or the like, connected to the lower interior portion of the cylinders F. The lower interior portions of the cylinders F have first stops 20 disposed therein, with the stops having ports 22 formed therein below the upper edges thereof, with the ports permitting water from the laterals 18 to discharge into the lower confines of the cylinders F. The cylinders F have pistons G slidably and sealingly mounted within the interiors thereof, and the pistons G have rigid elongate members 24 extending upwardly therefrom. The members 24 have longitudinally extending bores 26 defined therein that are in communication with passages 28 that extend longitudinally through the pistons G and second stops 30 that extend upwardly from the pistons. The pistons G are shown in FIG. 1 in the lowermost position where they are in contact with the upper edges of the stops 20, and as so disposed water may be forced into the lower portions of the cylinders F through the laterals 18 to move the pistons G and rigid members 24 upwardly in the cylinders F, until the second stops 30 contact the lower interior surfaces of the first ends 12, as shown in FIG. 2.

The second water supply line D has a number of second laterals 32 extending therefrom that are connected to the upper interior portions of the cylinders F by conventional screw means 34. The second stops 30, when in contact with the first ends 12, so disposed the pistons G that water under pressure may be discharged into the upper interior portions of the cylinders F to force the pistons G and elongate members 24 downwardly relative to the cylinders F for reasons that will be explained later in detail.

Each elongate member 24 on an upper first end thereof supports a ring 36 that has a number of pairs of circumferentially spaced lugs 38 extending outwardly therefrom. The ring 36 also supports a spray head H of conventional design that includes an orifice 42 through which water is discharged to be atomized into spray to irrigate the surface of the ground E when the spray heads H are disposed as shown in FIG. 2. The circumferentially spaced pairs of lugs 38 have pins 44 extending transversely therebetween, which pins serve to pivotally support sets of protectors K that are of such configuration as to remain in the first closed position shown in FIG. 3, when the protectors are forced either upwardly or downwardly through the ground.

The protectors K, when in the first position shown in FIG. 3, prevent earth being forced into the spray heads H, or the spray heads being damaged as they are being moved either upwardly or downwardly through the ground E. The sets or protectors K remain in the first position shown in FIG. 3 due to the upwardly and inwardly curved external surfaces 46 thereof, which surfaces are of such shape that the protectors are forced together due to the pressure exerted by the earth on the surfaces 46 as the protectors K are moved either upwardly or downwardly relative to the cylinders F.

When water has been discharged from the first supply line C and laterals 18 into the lower confines of the cylinders F, to move the pistons, elongate members 24, spray heads H and sets of protectors K to the elevated position shown in FIG. 2, the water will discharge through the passages 28 and bores 26 to discharge onto the curved interior surfaces 48 of protectors K and pivot the protectors to the second position shown in FIG. 4, where water is free to discharge from the spray heads H for irrigating purposes. The protectors K have stops 50 formed on the lower portions thereof, which stops limit the outward movement of the protectors to the second position shown in FIG. 4. The total transverse cross section of the passages 26 is substantially less than the interior transverse cross section of supply line C. As a result, supply line C tends to discharge water into the cylinders F at a rate greater than that at which the water can flow through the passages 24, and a substantial upward force is exerted on the pistons G as a result thereof.

The first water supply line C, as may best be seen in FIG. 6, has a first valve 52 therein that controls the flow of water from the source B to the laterals 18 to enter the lower interior portions of the cylinders F to force the pistons G upwardly therein, as well as to supply water for irrigation purposes after the pistons G have moved to the uppermost positions as shown in FIG. 1. A lateral 54 extends from the first water supply line C and has a second valve 55 therein that permits water to discharge from the first supply line C when the first valve 52 is in a closed position. The second water supply line D has a third valve 56 therein, which valve when opened permits water to discharge from the source B into the laterals 32 and then into the upper portions of the cylinders F to move the pistons G downwardly therein, when the second valve 55 is in an open position.

A lateral 58 extends from the second water supply line D as may be seen in FIG. 6, and has a fourth valve 60 therein, which fourth valve when in an open position permits water in the upper portions of the cylinders F to discharge therefrom when third valve 56 is in a closed position, and water is being discharged into the lower portions of the cylinders F by the first valve 52 being opened. Water discharged through the laterals 54 and 58 may be returned to the water source B for pressurization and returned to the irrigation system, or the water in the laterals may be directed to another source (not shown) for purposes other than irrigation.

The use and operation of the invention described is extremely simple. When the first valve 52 and fourth valve 60 are opened, with second valve 55 and third valve 56 closed, water discharges from the first supply line C into the lower portions of the cylinders F to move the pistons G upwardly from the location shown in FIG. 1 to that illustrated in FIG. 2. As this upward movement of the pistons takes place, the elongate members 24, spray heads H and protectors K are forced upwardly through the ground E. The pressure exerted by the ground on the surfaces 46 of protectors K is in such a direction that the protectors remain in the first position shown in FIG. 3 until they emerge above the upper surface of ground E. During this upward movement of the elongate members 24, water is discharging under pressure through the orifices 42 to impinge on the interior surfaces 48 of protectors K and as the protectors K emerge from the ground surface, this impinging water pivots them to the second position shown in FIG. 4. The elongate members 24, spray heads H, and protectors K are at their maximum elevation relative to the cylinders F when the second stops 30 are in contact with the first ends 12 of the cylinders F, as shown in FIG. 2. With the protectors K in the second position as shown in FIG. 4, water discharges as spray from the heads H to irrigate the upper surface of the ground E.

After the irrigation operation is completed, third valve 56 and second valve 55 are opened, and first valve 52 and fourth valve 60 closed. Water now discharges through the second supply line D and laterals 32 to enter the upper interior portions of the cylinders F to force the pistons G downwardly therein until the pistons contact the first stops 20. As this downward movement of the pistons G takes place, water in the lower portions of the cylinders F is forced outwardly through the laterals 18, first supply line C, laterals 54 and valve 55. As the pistons G, elongate members 24, heads H, and protectors K move downwardly, the lower external surfaces 46 of protectors K are brought into pressure contact with the ground E and as the protectors move downwardly through the ground E they are forced into the first protective position shown in FIG. 3. With the protectors K in the position shown in FIG. 3, earth or other debris cannot enter the heads H, nor can the heads H be damaged due to pressure contact with the ground E.

After the invention has been returned to the retracted position shown in FIG. 5, the third valve 56 and second valve 55 are placed in the closed position. When it is desired to again irrigate, the operation above described is repeated. It will be particularly noted in FIG. 5 that when the invention is in the retracted position, as shown therein, the spray heads H and protectors K are located at a sufficient distance below the upper surface of the ground E so as not to be damaged by plowing or cultivating of the field that is defined by the ground E. Each of the pistons G has a number of circumferentially extending grooves formed therein in resilient sealing rings 29 that are so disposed as to slidably seal with the interiors of the cylinders F to prevent water from by-passing around the pistons.

I claim:

1. An irrigation system that may be buried in a field below the maximum depth to which said field will be plowed, said system connected to a source of water under pressure, said system including:
   a. a plurality of spaced substantially vertical cylinders having first and second ends, said first ends having longitudinally extending openings therein, and said cylinders buried in the ground defining said field at such a depth that said first ends are substantially below the maximum depth to which said field will be plowed;
   b. a plurality of rigid, substantially vertical elongate members that are slidably mounted in said openings and extend into said cylinders, with said members having longitudinal bores therein, and said members having first and second ends;
   c. a plurality of pistons slidably and sealingly movable in said cylinders that are connected to said first ends of said members, said pistons having longitudinal passages therein that communicate with said bores;
   d. a plurality of first and second stop means for limiting the movement of said pistons in said cylinders to first and second positions where said pistons are longitudinally spaced from said first and second ends;
   e. first and second tubular water supply means connected to said source of water and to the lower and upper interior portions of said cylinders;
   f. first and second valves connected to said first tubular means and third and fourth valves to said second tubular means, with said first and fourth valves when open and said second and third valves closed permitting water to flow from said source to move said pistons from said first to said second position and said water thereafter discharging upwardly through said bores in said members, and said second and third valves when open and said first and fourth valves closed permitting water to flow from said source to the upper interior portions of said cylinders to force said pistons from said second to said first position;
   g. a plurality of spray heads mounted on said second ends of said tubular members and in communication with said bores;
   h. a plurality of sets of spray head protectors pivotally supported from said second ends of said members, each of said sets capable of occupying first and second positions, with said sets when in said first position extending around said heads and when in said second position extending outwardly therefrom, said protectors having external surfaces of such shape that when said pistons move from said first to said second position and said members, spray heads and sets of protectors are moved upwardly through said ground, the force exerted by said ground on said protectors will maintain the latter in said first position until said protectors emerge above the surface of said ground, with said protectors including interior surfaces on which water from said spray heads impinge to pivot said protectors to said second position when they are above the surface of said ground, said pistons when they move from said second to said first position moving said elongate members, spray heads and protectors downwardly relative to said cylinders, and the force exerted by the ground on said protectors as the latter move downwardly therethrough pivoting said protectors to said first position.

2. An irrigation system as defined in claim 1 in which said first stop means are a plurality of cylindrical shells mounted in the lower interior portions of said cylinders, said shells having openings so located therein that water can flow from said first tubular means into said lower portions of said cylinders and from said lower portions into said first tubular means.

3. An irrigation system as defined in claim 1 in which said second stop means are protuberances of less transverse cross section than that of said pistons that extend upwardly from said pistons and contact said first ends when said pistons are in said second position.

4. An irrigation system as defined in claim 1 in which the interior transverse cross section of said first tubular means is substantially greater than the total transverse cross sections of said passages whereby the water discharged into the lower portions of said cylinders will exert a sufficient force on the lower surfaces of said pistons to move the latter from said first position to said second position as water concurrently flows upwardly through said passages and bores to discharge from said spray heads.

5. An irrigation system as defined in claim 1 in which each of the protectors in one of said sets has a convex exterior surface and a concave interior surface.

6. An irrigation system as defined in claim 1 in which said protectors in each of said sets when in said first position define a closed shell that completely encloses the one of said spray heads disposed within the confines thereof.

* * * * *